March 15, 1966 R. BÄR 3,240,018

GAS TURBINE

Filed Jan. 24, 1963

INVENTOR
RUDOLF BÄR

BY Dicke & Craig
ATTORNEYS

United States Patent Office 3,240,018
Patented Mar. 15, 1966

3,240,018
GAS TURBINE
Rudolf Bär, 22 Stockheimer Strasse, Stuttgart-
Zuffenhausen, Germany
Filed Jan. 24, 1963, Ser. No. 265,569
Claims priority, application Germany, Mar. 22, 1962,
B 66,475
6 Claims. (Cl. 60—39.75)

The invention relates to a gas turbine which is much more economical in operation than known types, and its applications are much more varied. The advantages of this turbine are obtained in that a high pressure can be generated with the aid of one single shaft. Both generation and utilization of the pressure take place on both sides of the rotor. Depending on the construction of the gas turbine, a plurality of combustion chambers can be provided on one and the same shaft.

Initial pressure is generated via a blower or compressor. Then, the pressure is boosted by the centrifugal force obtained from the movement of the gas turbine rotor. This pressure can be reinforced still further by using a casing provided with an indent.

The combustion chambers are arranged on the circumference of the rotor in such a manner that the power due to the combustion acts directly on the blades. The direct action on the blades and the utilization of the force according to the lever principle make it possible to use the gas turbine alternately at high and low speeds as required.

Accordingly, it is an object of the present invention to provide a gas turbine which assures efficient operation at all rotational speeds.

It is another object of the present invention to provide a gas turbine which utilizes a dual compressor system utilizing the centrifugal forces and centripetal forces by means of the same gas turbine shaft.

Figure 2:
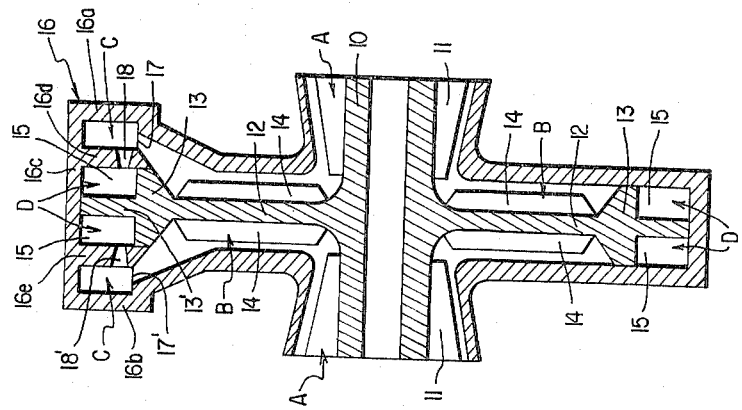
Figure 1:
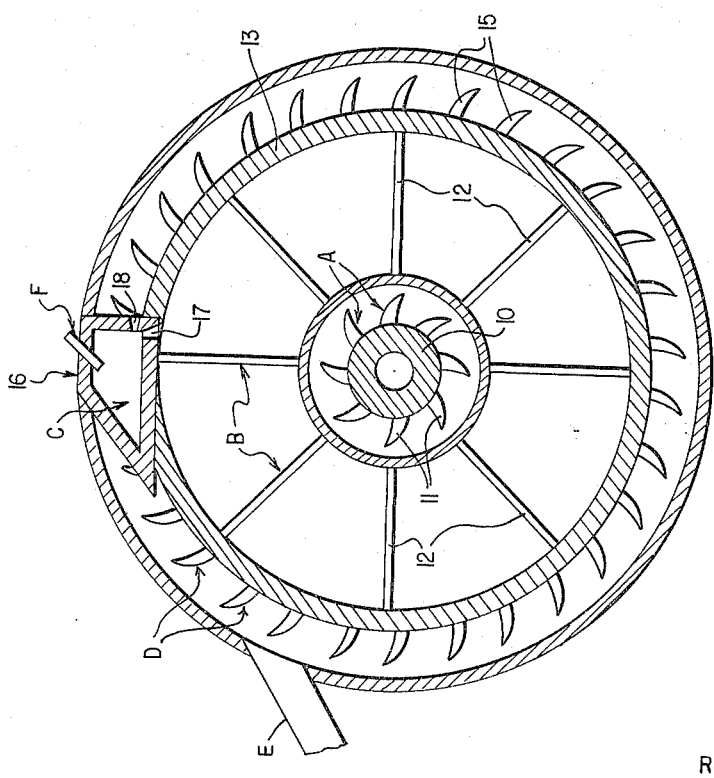

These and other objects, features, and advantages of the present invention will become more obvious from the following description when taken in connection with the accompanying drawing which shows, for purposes of illustration only, one embodiment in accordance with the present invention, and wherein:

FIGURE 1 is an axial, cross-sectional view through the gas turbine in accordance with the present invention, and FIGURE 2 is an axial, longitudinal cross-sectional view through the gas turbine of FIGURE 1.

The present invention is a further development of my copending applications Serial No. 265,572 and Serial No. 265,570, filed on January 24, 1963, and entitled "Turbo Engine" and "Heavy Duty Compressor or Pump," the contents of said copending applications being incorporated herein by reference to the extent necessary.

The turbo-engine described in said copending application Serial No. 265,572 utilizes a rotary piston system which essentially consists of a rotary piston, the outer circumference of which is disposed concentrically to the axis of rotation.

Gas turbines of different types are well known in the art. However, the gas turbine according to the present invention represents a new concept and construction, and distinguishes itself by the fact that it combines an axial compressor with a radial-type compressor as the first and second stages which precompress the air to be combusted in a combustion chamber for propelling the turbine wheel provided with suitable blades or vanes.

Referring now to the drawing wherein like reference numerals are used in the two views to designate like parts, the first stage of the compressor for the gas turbine in accordance with the present invention is constituted by the axial compressor A including appropriate blades or vanes 11 suitably mounted on the rotor shaft 10 constituted by the extension of the base of the circular column generally designated by reference numeral B. The term "circular column" is used to describe the rotor of the gas turbine in accordance with the present invention which is constituted by a rotor wheel in the form of a circular column. This term has been coined to describe the present invention and utilizes the term "column" in its ordinary meaning. A column consists of a base, in the instant situation, forming the shaft 10, a bearer or supporting portion 12 and a capital 13. Since the rotor is constituted by a column-like structure of substantial inertia, as viewed in cross section in FIGURE 2, which is circular or endless as viewed in FIGURE 1, the term "circular column" is used herein to describe the rotor structure. Obviously, the supporting members 12 may be spaced over the circumference, the word "circular" being applicable to the instant structure by reason of the continuous or endless capital structure 13.

The blades 11 of the axial compressor A may be of any known design and construction and may be suitably secured at the lateral projections or elongations of the base 10 of the circular column.

The second stage of the gas turbine compressor is constituted by a radial compressor or the like formed by blades or vanes 14 mounted on the bearer or supporting portion 12 of the circular column. In conformity with the provisions of two axial blowers A, two radial compressors are provided on opposite sides of the circular column. The blades 14 boost the pressure of the air to be supplied to the combustion chamber by centrifugal forces due to the movement of the gas turbine rotor.

The blade rim generally designated by reference character D is constituted by a plurality of turbine blades or vanes 15 of any appropriate conventional design, suitably secured on the capital 13 of the circular column B, and more particularly on both sides of the central capital portion 13'.

The combustion chamber generally designated by reference character C is constituted on both sides of the blades 15 by the housing generally designated by reference numeral 16 and including radially extending upright portions 16a and 16b along the outer surfaces thereof, a ceiling portion 16c and partition wall portions 16d and 16e. The air from the radial compressor flows into the combustion space C through apertures 17 and 17'. Fuel is injected into each of the combustion chambers C by means of conventional fuel-injection means generally designated by reference character F and only indicated schematically. Appropriate ignition means (not shown) may be provided as is well known with gas turbines. The combustion charge is applied to the blades 15 of the turbine through discharge nozzles 18 and 18', of venturi-like construction as shown in FIGURE 2. A conventional exhaust means is schematically indicated in FIGURE 1 by reference character E.

While I have shown and described one embodiment in accordance with the present invention, it is understood that the same is not limited thereto but is susceptible of numerous changes and modifications as known to a person skilled in the art.

What is desired as new and to be secured by Letters Patent is as follows:

1. A gas turbine having an axis of rotation, comprising: housing means,
rotor means rotating within said housing means about said axis and constituted by a circular column having base, supporting, and capital portions,
a set of gas turbine blade means mounted on said capital portion and rotating within a space formed within said housing means for the blade means, means forming a combustion chamber within said housing means adjacent to said space, means for supplying compressed air into said combustion chamber including axial compressor means formed in part by said base portion and radial compressor means formed in part by said supporting portion, and means for directly supplying the combustion gases to said blade means.

2. A gas turbine according to claim 1, wherein two base portions, two axial and radial compressor means, two combustion chambers, and two sets of blade means are provided, one each on a respective side of a transverse cross-sectional plane through the supporting portion of the circular column.

3. A gas turbine according to claim 2, wherein said combustion chamber is each defined by two parallel substantially radial wall portions of said housing means interconnected by radially spaced, axially extending wall portions, and the combustion gases are directly supplied to said space through discharge aperture means provided in the wall portion separating said space from the combustion chamber.

4. A gas turbine according to claim 3, wherein said space is defined by the outer one of the axially extending wall portion, by one of said substantially radial wall portions, by a radial extension of said capital portion, and by the capital portion.

5. A gas turbine according to claim 1, wherein said combustion chamber is each defined by two parallel, substantially radial wall portions of said housing means interconnected by radially spaced, axially extending wall portions, and the combustion gases are directly supplied to said space through discharge aperture means provided in the wall portion separating said space from the combustion chamber.

6. A gas turbine according to claim 5, wherein said space is defined by the outer one of the axially extending wall portion, by one of said substantially radial wall portions, by a radial extension of said capital portion, and by the capital portion.

References Cited by the Examiner

UNITED STATES PATENTS

| | | | |
|---|---|---|---|
| 1,339,730 | 5/1920 | Williams | 60—39.43 |
| 2,694,291 | 11/1954 | Rosengart | 60—35.6 X |
| 2,941,355 | 6/1960 | Peterson | 60—39.75 X |
| 3,045,427 | 7/1962 | Baize et al. | 60—39.75 |

FOREIGN PATENTS 776,606  6/1957  Great Britain.

EDGAR W. GEOGHEGAN, *Primary Examiner.*

JULIUS E. WEST, *Examiner.*